United States Patent
Carmon

(10) Patent No.: US 10,616,170 B2
(45) Date of Patent: Apr. 7, 2020

(54) METHOD FOR INITIATING ACTIVITIES ON A COMPUTING DEVICE ON THE BASIS OF INFORMATION RELATED TO ELECTRONIC MESSAGES AND/OR GYROSCOPE

(71) Applicant: Nes Carmon, Gdera (IL)

(72) Inventor: Nes Carmon, Gdera (IL)

( * ) Notice: Subject to any disclaimer, the term of this patent is extended or adjusted under 35 U.S.C. 154(b) by 0 days.

(21) Appl. No.: 14/972,142

(22) Filed: Dec. 17, 2015

(65) Prior Publication Data
US 2017/0180300 A1  Jun. 22, 2017

(51) Int. Cl.
*H04L 12/58* (2006.01)
*H04L 29/08* (2006.01)

(52) U.S. Cl.
CPC .............. *H04L 51/32* (2013.01); *H04L 67/22* (2013.01)

(58) Field of Classification Search
None
See application file for complete search history.

(56) References Cited

U.S. PATENT DOCUMENTS 8,560,229 B1  10/2013  Park et al.
8,661,368 B2  2/2014  Maehiro et al.
2011/0113349 A1*  5/2011  Kiciman ............... G06F 17/241
                                                715/753
2014/0067828 A1*  3/2014  Archibong .......... H04L 65/4084
                                                707/748
2015/0163189 A1*  6/2015  Proctor ................... H04L 51/32
                                                715/753
2015/0304300 A1*  10/2015  Bender ............... H04L 12/1895
                                                726/4
2016/0043980 A1*  2/2016  Kalb ....................... H04L 51/20
                                                705/39
2016/0182420 A1*  6/2016  Shen ...................... H04L 51/12
                                                709/206
2017/0004396 A1*  1/2017  Ghotbi ................ G06F 3/04842

* cited by examiner

*Primary Examiner* — Kenny S Lin

(57) ABSTRACT

Disclosed is a method for initiating activities on a computing device on the basis of information related to electronic messages and/or gyroscope. The present invention can be used for the initiation of one or more of the following five activities: (1) collecting information about when and how long a user of a computing device reads a message in a feed of a social network; (2) displaying an internal message in a social network application; (3) sending a set of messages to users of a social network application; (4) sending a message to a list of users of a social network application; (5) sending a personalized message; and (6) providing a bonus to contacts who share the received message with other contacts.

1 Claim, 6 Drawing Sheets

METHOD FOR INITIATING ACTIVITIES ON A COMPUTING DEVICE ON THE BASIS OF INFORMATION RELATED TO ELECTRONIC MESSAGES AND/OR GYROSCOPE

CROSS-REFERENCE TO RELATED APPLICATIONS

This application claims benefit of provisional application 62/198506 filed on Jul. 29, 2015.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention is in the technical field of electronic messaging and, in particular, in the field of electronic messaging on a computing device.

There are existing inventions allowing computing devices, such as desktop computers, mobile computers, and mobile devices, to initiate activities on the basis of the direction of movement of the computing device or on the basis of the movements of the cursor across the elements of the content displayed on a computer device.

A typical example of an invention allowing the initiation of activities on the basis of the direction of movement of a computing device can be found in U.S. Pat. No. 8,560,229 (2013) by Park, et al. U.S. Pat. No. 8,560,229 refers to a method and device for sensor based activity detection. In U.S. Pat. No. 8,560,229, a sensor is used to detect movement of a mobile device. The sensor can be, for instance, an accelerometer. The data received from the accelerometer may be averaged together and compared to a threshold value. If the average of the data is greater than a threshold value, the mobile device may be assumed to be moving. This information may be used to control the frequency of data collection by, for example, a GPS receiver in order to maximize utility and minimize power use.

A typical example of an invention allowing the initiation of activities on the basis of the movements of the cursor across the elements of the displayed content can be found in the U.S. Pat. No. 8,661,368 (2014) by Maehiro, et al. U.S. Pat. No. 8,661,368 refers to an invention for scroll control according to input of cursor movement. In this invention, a main area of a display device, buttons and a map display area where a map is scrolled are provided. A cursor can be moved to an arbitrary position of the main area according to directional input received from an input device. When a decision input is performed with the input device when the cursor points to each button, processing assigned to the button to which the cursor points is performed. When a user inputs a direction and a special input button is not selected, the cursor is moved throughout the main area. When the user inputs a direction while the special input button is selected, the cursor is moved only within the map display area and the map is scrolled as required.

The existing prior art, including the aforementioned two patents, does not disclose any invention that will allow a computing device to initiate certain activities related to the collection and the transmission of information to an administrator of a social network or sending one or more messages in a feed of a social network, on the basis of: (i) the time for which an electronic message is viewed; (ii) whether or not the viewed electronic message is highlighted which would mean that the user is reading the electronic message; (iii) the position of a computing device in relation to a human face; (iv) the place of watching an electronic message; (v) entering a password; (vi) entering a barcode; (vii) the current time; (viii) the time moment when the user of the computing device starts following another user in a social network; and (ix) comparison of the popularity of two or more messages in a social network. Moreover, the existing prior art, including the aforementioned two patents, does not disclose any invention allowing the submission of a personalized message on the basis of an assessment of whether the input in a social network application contains a parameter that is the same as a parameter contained in a database. Furthermore, the existing prior art, including the aforementioned two patents, does not disclose an invention allowing the user of a social network to provide a bonus to contacts who share the received message with other contacts.

In the light of what is discussed above, there is a need in the art for a method to initiate activities related to the collection and the transmission of information to an administrator of a social network or sending one or more messages in a feed of a social network on the basis of the events mentioned in the previous paragraph. Also, there is a need in the art for a method allowing the submission of a personalized message on the basis of an assessment of whether the input in a social network application contains a parameter that is the same as a parameter contained in a database. In addition, there is a need in the art for a method allowing the user of a social network to provides a bonus to contacts who share the received message with other contacts?

SUMMARY OF THE INVENTION

The present invention relates to a method for initiating activities on a computing device on the basis of information related to electronic messages and/or gyroscope. The present invention can be used for the initiation of one or more of the following five activities: (1) collecting information about when and how long a user of a computing device reads a message in a feed of a social network; (2) displaying an internal message in a social network application; (3) sending a set of messages to users of a social network application; (4) sending a message to a list of users of a social network application; (5) sending a personalized message; and (6) providing a bonus to contacts who share the received message with other contacts.

Each of the aforementioned activities can be triggered by different factors. The activity related to the collection of information about when and how long a user of a computing device reads a message in a feed of a social network application can be triggered by a combination of one or more of the following three factors: (1) the time for which an electronic message is viewed by the user of a computing device; (2) whether or not the electronic message viewed by the user of a computing device is highlighted which would mean that the user is reading the electronic message; and (3) the position of a computing device in relation to a human face as measured by a gyroscope. It should be noted that the term "highlighted" as used in this patent application refers not only to highlighted messages, but also to messages which are visible on the screen of the user.

The activity related to displaying an internal message in a social network application can be triggered by one or more of the following four factors: (1) the current time; (2) the place of watching an electronic message; (3) entering a password in a social network application; and (4) entering a barcode in a social network application.

The activity related to sending a set of messages to the user of a computing device can be triggered by one or more of the following two factors: (1) the current time; and (2) the time moment when the user of the computing device starts following another user in a social network application;

The activity related to sending a message to a list of users of a social network application can be triggered by the outcome of a comparison of the popularity or the performance of two or more messages in a social network sent to a part of a list of users of a social network. After the comparison, the message which received the most views will be sent to the entire list of users of the social network.

The activity related to sending a personalized message can be triggered by an input in a feed of a social network if the input in a feed of a social network application contains a parameter that is the same as a parameter contained in a database. For example, if a user enters the word "John" in the feed of a social network application and the word "John" is contained in a database, he or she will receive the personalized message "Hello John".

The activity related to providing a bonus to contacts who share the received message with other contacts can be triggered by sharing a social network message sent by other users. Such activity is also known as "chain letter" feature. The activity allows the user to submit messages which would not be regarded as spam. This is because the messages will be sent to contacts of the user in the social network, and not to unknown individuals. Such an activity will allow the user to share information with a large number of people because the recipients of the messages will be encouraged to make copies of the messages and pass them on to as many recipients as possible.

FIGURES—REFERENCE NUMERALS

Figure 1:
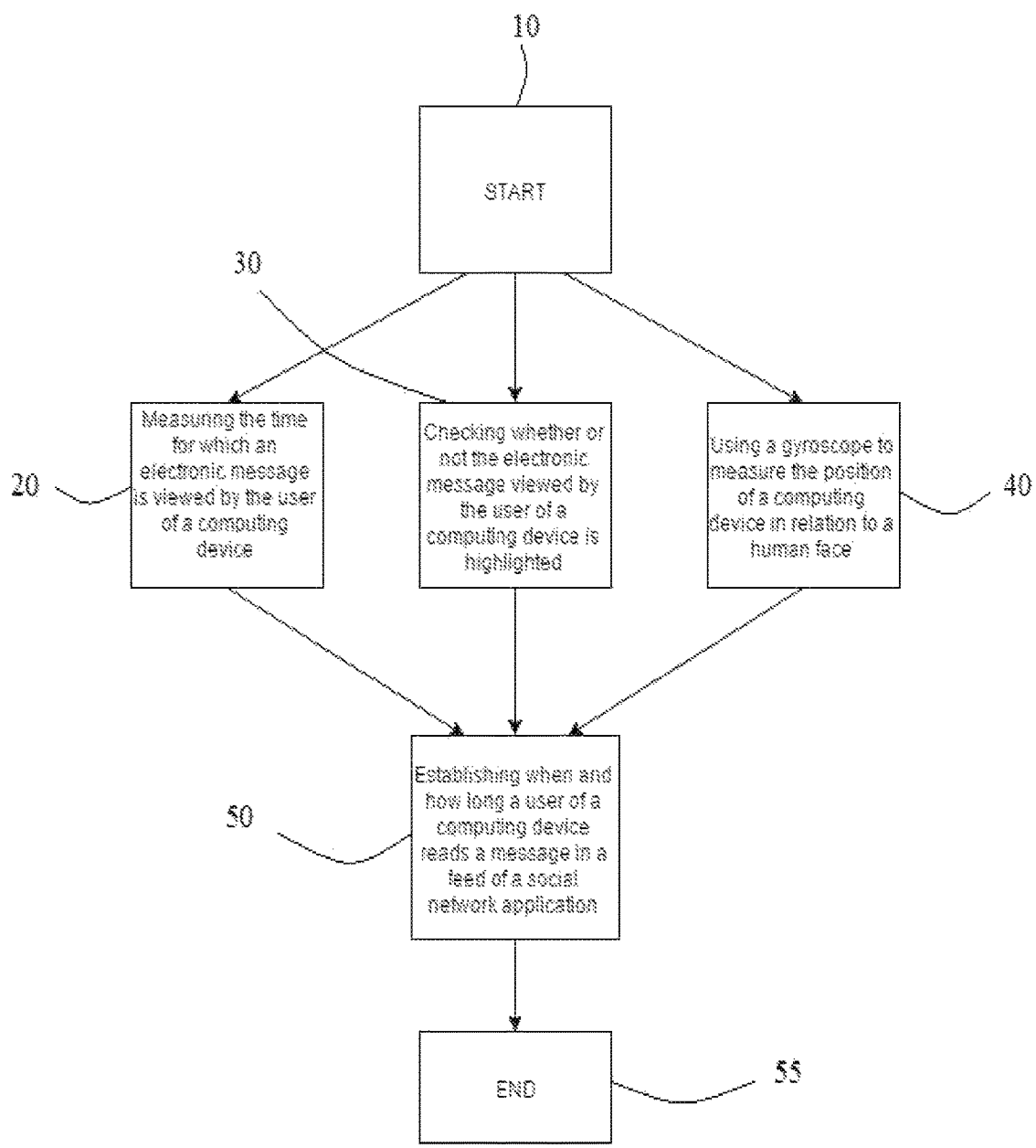
FIG. 1, according to an embodiment of the present invention, is an illustration of a flow-chart that explains the process of initiating an activity related to establishing when and how long a user of a computing device reads a message in a feed of social network application.

10—Start of the process of initiation of an activity related to establishing when and how long a user of a computing device reads a message in a feed of social network application

20—Measuring the time for which an electronic message is viewed by the user of a computing device

30—Checking whether or not the electronic message viewed by the user of a computing device is highlighted

40—Using a gyroscope to measure the position of a computing device in relation to a human face

50—Establishing when and how long a user of a computing device reads a message in a feed of a social network application

55—End of the process of initiation of an activity related to establishing when and how long a user of a computing device reads a message in a feed of social network application

60—Start of the process of initiation of an activity related to displaying an internal message in a social network application

70—Collecting information about the current time.

80—Collecting information about the place of watching an electronic message

90—Entering a password in a social network application

100—Entering a barcode in a social network application

115—End of the process of initiation of an activity related to displaying an internal message in a social network application

110—Displaying an internal message in a social network application

120—Start of the process of initiation of an activity related to sending a set of messages to the user of a computing device

130—Collecting information about the time moment when the user of the computing device starts following another user in a social network application

140—Sending a set of messages to the user of a computing device

145—End of the process of initiation of an activity related to sending a set of messages to the user of a computing device

150—Start of the process of initiation of an activity related to sending a message, which received the most views after being sent to a part of a list of users of a social network, to an entire list of users in a social network

160—Comparing the popularity of two or more messages in a social network sent to a part of a list of users of a social network

170—Sending the message, which received the most views after being sent to a part of a list of users of a social network, to an entire list of users in a social network

175—End of the process of initiation of an activity related to sending a message, which received the most views after being sent to a part of a list of users of a social network, to an entire list of users in a social network

180—Start of the process of initiation of an activity related to sending a personalized message to a user of social network application

190—Assessing if the input in a feed of a social network application contains a parameter that is the same as a parameter contained in a database.

200—Sending a personalized message to a user of social network application

205—End of the process of initiation of an activity related to sending a personalized message to a user of social network application 210—Start of the process of initiation of an activity related to providing a bonus to contacts who share the received message with other contracts 220—The user selectively or randomly selects a number of contacts in an online social network 230—The user sends a message to the selected contacts 240—The user provides a bonus to contacts who share the received message with other contacts 250—End of the process of initiation of an activity related to providing a bonus to contacts who share the received message with other contracts

DETAILED DESCRIPTION OF THE INVENTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Referring now to the invention in more detail, in FIG. 1 there is shown an illustration of a flow-chart that explains the process of initiating an activity related to establishing when and how long a user of a computing device reads a message in a feed of social network application. The process described in FIG. 1 consists of six steps, namely: start of the process of initiation of an activity related to establishing when and how long a user of a computing device reads a message in a feed of social network application 10; measuring the time for which an electronic message is viewed by the user of a computing device 20; checking whether or not the electronic message viewed by the user of a computing device is highlighted 30; using a gyroscope to measure the position of a computing device in relation to a human face 40; establishing when and how long a user of a computing device reads a message in a feed of a social network application 50; and end of the process of initiation of an activity related to establishing when and how long a user of a computing device reads a message in a feed of social network application 55.

In more detail, still referring to the invention of FIG. 1, the user of the invention starts the process of initiation of an activity related to establishing when and how long a user of a computing device reads a message in a feed of social network application 10. Afterwards, the invention may collect data through one or more of the following three ways of collecting data: measuring the time for which an electronic message is viewed by the user of a computing device 20; checking whether or not the electronic message viewed by the user of a computing device is highlighted 30; and using a gyroscope to measure the position of a computing device in relation to a human face 40. Then, the data collected through steps 20, 30, and 40 is analyzed on the basis of an algorithm based on the preferences of the user of the invention. On the basis of the data collected through steps 20, 30, and 40 the algorithm establishes when and how long a user of a computing device reads a message in a feed of a social network application 50. The following step is the end of the process of initiation of an activity related to establishing when and how long a user of a computing device reads a message in a feed of social network application 55. The information about when and how long a user of a computing device reads a message in a feed of a social network application 50 may be presented to the user in a numerical, textual, and/or graphical form.

Figure 2:
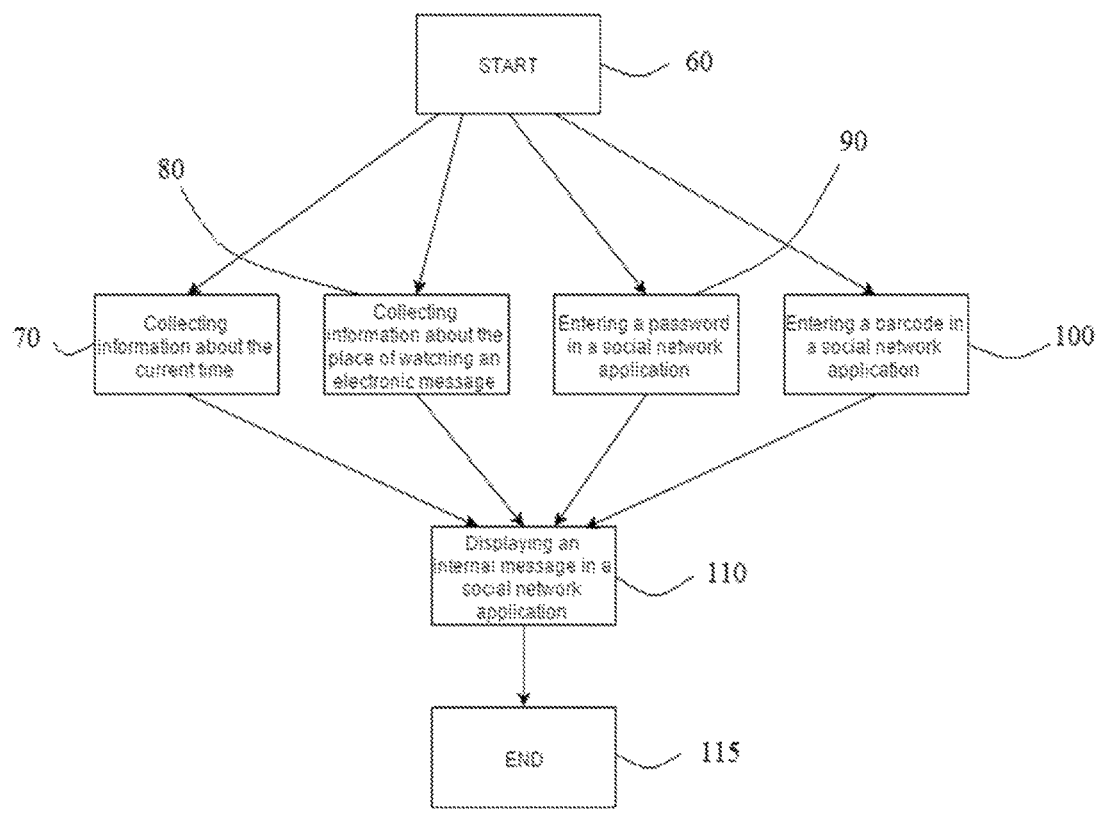
FIG. 2, according to an embodiment of the present invention, is an illustration of a flow-chart that explains the process of initiating an activity related to displaying an internal message in a social network application.

Referring now to the invention in more detail, in FIG. 2, there is shown an illustration of a flow-chart that explains the process of initiating an activity related to displaying an internal message in a social network application. The process described in FIG. 2 consists of seven steps, namely: start of the process of initiation of an activity related to displaying an internal message in a social network application 60; collecting information about the current time 70; collecting information about the place of watching an electronic message 80; entering a password in a social network application 90; entering a barcode in a social network application 100; displaying an internal message in a social network application 110, and end of the process of initiation of an activity related to displaying an internal message in a social network application 115.

In more detail, still referring to the invention of FIG. 2, the user of the invention starts the process of initiation of an activity related to displaying an internal message in a social network application 60. Afterwards, the invention may collect data through one or more of the following four ways of collecting data: collecting information about the current time 70; collecting information about the place of watching an electronic message 80; entering a password in a social network application 90; and entering a barcode in a social network application 100. Then, the data collected through steps 70, 80, 90 and 100 is analyzed on the basis of an algorithm based on the preferences of the user of the invention. On the basis of the data collected through steps 70, 80, 90, and 100 the algorithm decides on whether or not to display an internal message in a social network application 110. The following step is the end of the process of initiation of an activity related to displaying an internal message in a social network application 115.

Figure 3:
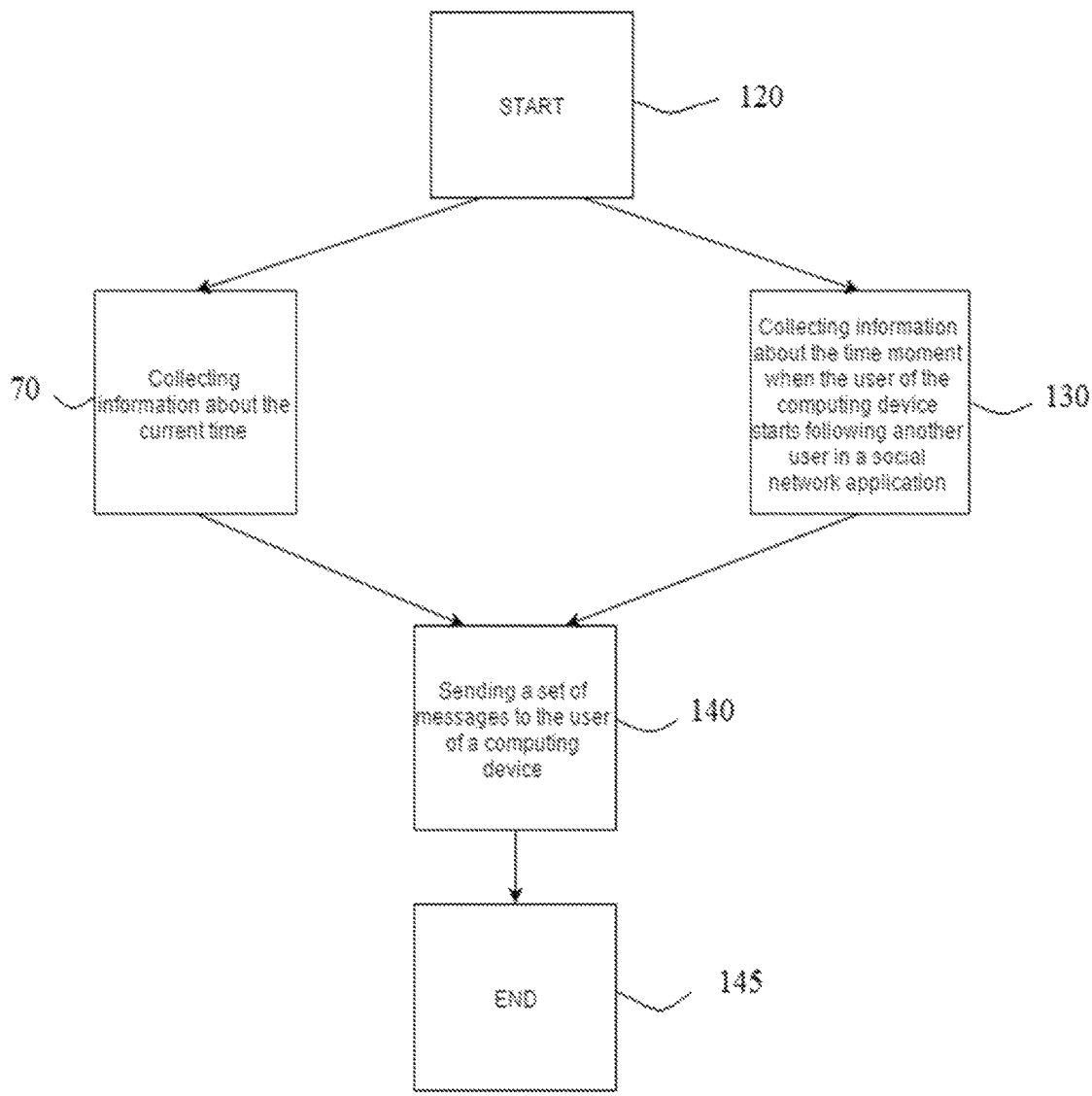
FIG. 3, according to an embodiment of the present invention, is an illustration of a flow-chart that explains the process of initiating an activity related to sending a set of messages to the user of a computing device.

Referring now to the invention in more detail, in FIG. 3 there is shown an illustration of a flow-chart that explains the process of initiating an activity related to sending a set of messages to the user of a computing device. The process described in FIG. 3 consists of five steps, namely: start of the process of initiation of an activity related to sending a set of messages to the user of a computing device 120; collecting information about the current time 70; collecting information about the time moment when the user of the computing device starts following another user in a social network application 130; sending a set of messages to the user of a computing device 140; and end of the process of initiation of an activity related to sending a set of messages to the user of a computing device 145.

In more detail, still referring to the invention of FIG. 3, the user of the invention starts the process of initiation of an activity related to sending a set of messages to the user of a computing device 120. Afterwards, the invention may collect data through one or more of the following two ways of collecting data: collecting information about the current time 70; and collecting information about the time moment when the user of the computing device starts following another user in a social network application 130. Then, the data collected through steps 70 and 130 is analyzed on the basis of an algorithm based on the preferences of the user of the invention. On the basis of the data collected through steps 70 and 130, the algorithm decides on whether or not to send a set of messages to the user of a computing device 140. The following step is end of the process of initiation of an activity related to sending a set of messages to the user of a computing device 145.

Figure 4:
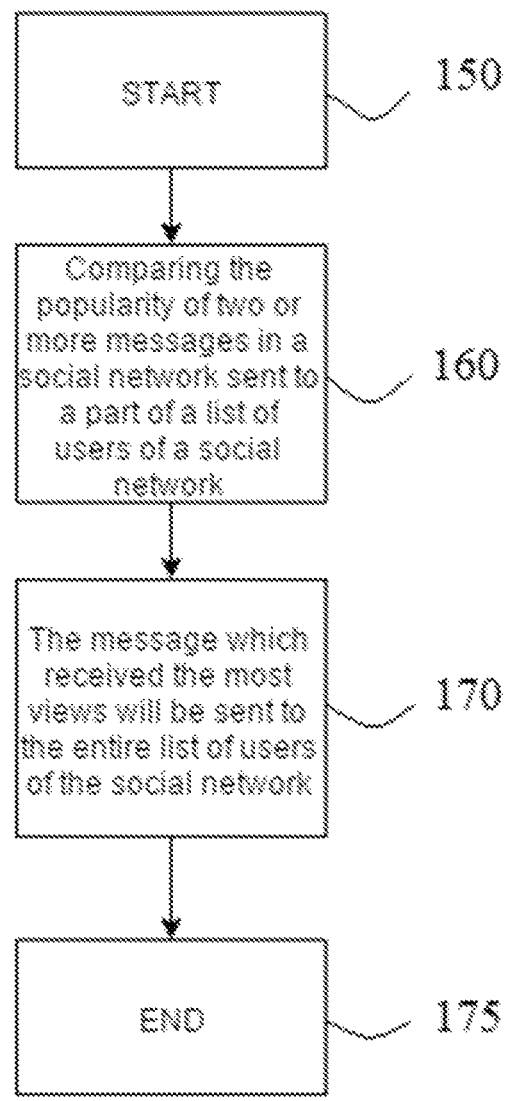
FIG. 4, according to an embodiment of the present invention, is an illustration of a flow-chart that explains the process of initiating an activity related to sending a message, which received the most views after being sent to a part of a list of users of a social network, to an entire list of users in a social network.

Referring now to the invention in more detail, in FIG. 4, there is shown an illustration of a flow-chart that explains the process of initiating an activity related to sending the message, which received the most views after being sent to a part of a list of users of a social network, to an entire list of users in a social network. The process described in FIG. 4 consists of four steps, namely: start of the process of initiation of an activity related to sending a message, which received the most views after being sent to a part of a list of users of a social network, to an entire list of users in a social network 150; comparing the popularity of two or more messages in a social network sent to a part of a list of users of a social network 160; sending the message, which received the most views after being sent to a part of a list of users of a social network, to an entire list of users in a social network 170, the end of the process of initiation of an activity related to sending a message, which received the most views after being sent to a part of a list of users of a social network, to an entire list of users in a social network 175.

In more detail, still referring to the invention of FIG. 4, the user of the invention starts the process of initiation of an activity related to sending the message, which received the most views after being sent to a part of a list of users of a social network, to an entire list of users in a social network 150. Afterwards, the invention collects data through comparing the popularity of two or more messages in a social network sent to a part of a list of users of a social network 160. Then, the data collected through step 160 is analyzed on the basis of an algorithm based on the preferences of the user of the invention. On the basis of the data collected through steps 160, the algorithm decides on whether or not to send the message to an entire list of users in a social network 170. The following step is the end of the process of initiation of an activity related to sending a message, which received the most views after being sent to a part of a list of users of a social network, to an entire list of users in a social network 175.

It should be noted that, in one embodiment of the invention, step 160 may refer to comparing the performance of two or more messages in a social network sent to a part of a list of users of a social network. In such a case, the performance of a message may relate to various factors, such as selling products through the message.

It should be pointed out the process the process of initiating an activity related to sending the message, which received the most views after being sent to a part of a list of users of a social network, to an entire list of users in a social network is a form of A/B testing. The term A/B testing can be defined as a randomized experiment with two variants. The two variants (A and B) are compared. The variant that become more popular or performs better is selected.

Figure 5:
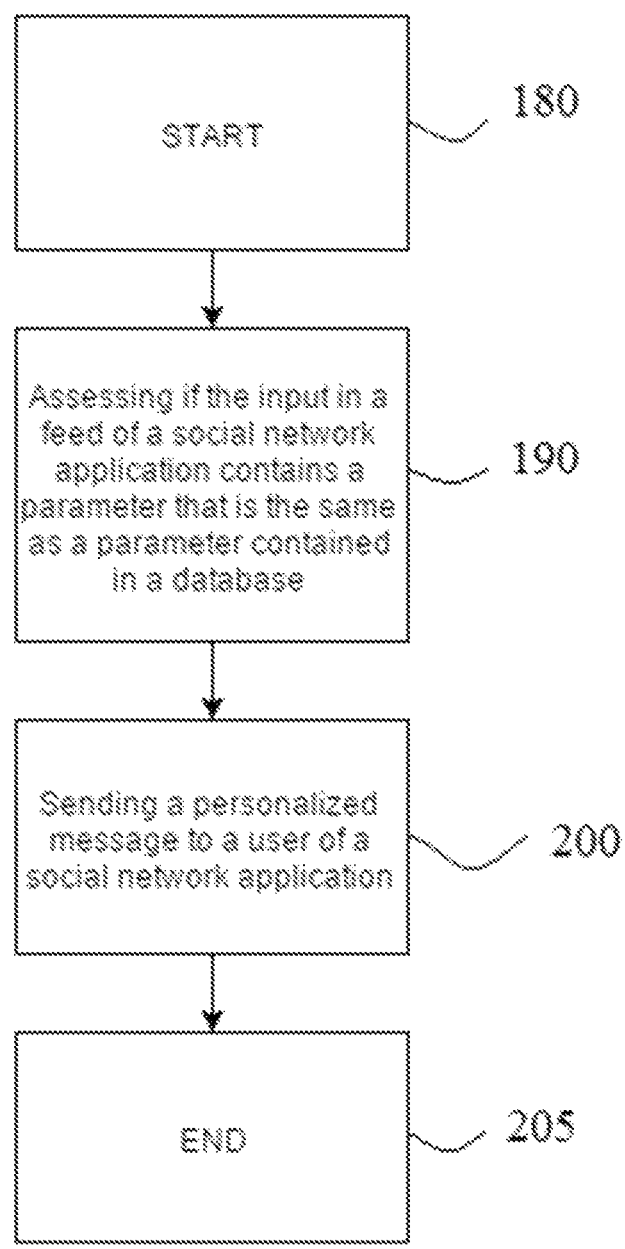
FIG. 5, according to an embodiment of the present invention, is an illustration of a flow-chart that explains the process of initiating an activity related to sending a personalized message to a user of social network application.

Referring now to the invention in more detail, in FIG. 5, there is shown an illustration of a flow-chart that explains the process of initiating an activity related to sending a personalized message to a user of social network application. The process described in FIG. 5 consists of four steps, namely: start of the process of initiation of an activity related to sending a personalized message to a user of social network application 180; assessing if the input in a feed of a social network application contains a parameter that is the same as a parameter contained in a database 190; and sending a personalized message to a user of social network application 200.

In more detail, still referring to the invention of FIG. 5, the user of the invention starts the process of initiation of an activity related to sending a personalized message to a user of social network application. Afterwards, the invention collects data through assessing if the input in a feed of a social network application contains a parameter that is the same as a parameter contained in a database 190. Then, the data collected through step 190 is analyzed on the basis of an algorithm based on the preferences of the user of the invention. On the basis of the data collected through steps 190, the algorithm decides on whether or not to send a personalized message to a user of social network application 200.

Figure 6:
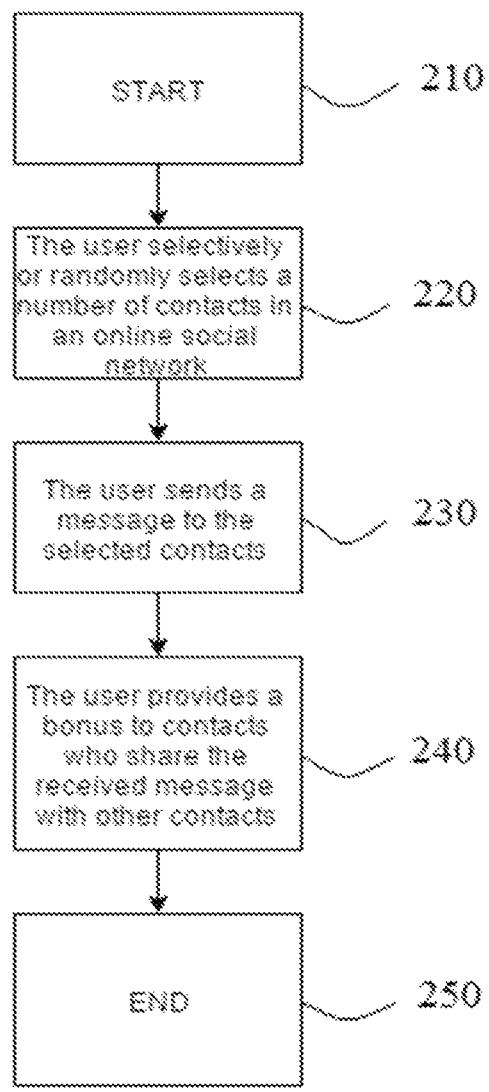
FIG. 6, according to an embodiment of the present invention, is an illustration of a flow-chart that explains the process of initiation of an activity related to providing a bonus to contacts who share the received message with other contracts.

Referring now to the invention in more detail, in FIG. 6, there is shown an illustration of a flow-chart that explains the process of initiation of an activity related to providing a bonus to contacts who share the received message with other contracts. The process described in FIG. 6 consists of five steps namely: Start of the process of initiation of an activity related to providing a bonus to contacts who share the received message with other contracts 210; the user selectively or randomly selects a number of contacts in an online social network 220; the user sends a message to the selected contacts 230; the user provides a bonus to contacts who share the received message with other contacts 240; and end of the process of initiation of an activity related to providing a bonus to contacts who share the received message with other contracts 250.

In more detail, still referring to the invention of FIG. 6, after the start of the process of initiation of an activity related to providing a bonus to contacts who share the received message with other contracts 210, the user selectively or randomly selects a number of contacts in an online social network 220. Afterwards, the user sends a message to the selected contacts 230. Next, the user provides a bonus to contacts who share the received message with other contacts 240. The bonus can be tokens, monetary sum, a discount, free access to a digital content, free or discounted services, and other tangible or intangible materials. The next step is the end of the process of initiation of an activity related to providing a bonus to contacts who share the received message with other contracts 250. The process described in FIG. 6 is also known as "chain letter" feature. The process allows the user to submit messages which would not be regarded as spam. This is because the messages will be sent to contacts of the user in the social network, and not to unknown individuals. The process described in FIG. 6 will allow the user to share information with a large number of people because the recipients of the messages will be encouraged to make copies of the messages and pass them on to as many recipients as possible.

In various embodiments, the present invention may include one or more of the six processes described in FIG. 1, FIG. 2, FIG. 3, FIG. 4, FIG. 5, and FIG. 6.

In one embodiment, the invention uses a method of creating an automatic segment of users based on users' behavior and sending automatic messages to the users in this segment. For example, this method allows checking whether a message sent to the user is opened by the user. If the message is not opened by the user, the user who did not open the message is added in a list of users to whom an automatic message will be sent. Such an automatic message can be, for example, a reminder that the user has not opened the message.

The present invention as shown in FIG. 1, FIG. 2, FIG. 3, FIG. 4, FIG. 5, and FIG. 6 may be implemented by hardware, software, or a combination of both. The present invention may be implemented through codes or instructions in a software application that can be implemented by a processor. Such a processor may include, for instance, microprocessor in a mobile terminal.

Furthermore, the embodiment is able to be implemented, for example, using a machine-readable medium or article which is able to store an instruction or a set of instructions that, if executed by a machine, cause the machine to perform the operations described herein. Such machine is able to include, for example, any suitable processing platform, computing platform, computing device, processing device, electronic device, electronic system, computing system, processing system, computer, processor, or the like, and is able to be implemented using any suitable combination of hardware and/or software.

The machine-readable medium or article is able to include, for example, any suitable type of memory unit, memory device, memory article, memory medium, storage device, storage article, storage medium and/or storage unit; for example, memory, removable or non-removable media, erasable or non-erasable media, write-able or re-write-able media, digital or analog media, hard disk drive, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like.

The instructions are able to include any suitable type of code, for example, source code, compiled code, interpreted code, executable code, static code, dynamic code, or the like, and are able to be implemented using any suitable high-level, low-level, object-oriented, visual, compiled and/or interpreted programming language, e.g., C, C++, Java, BASIC, Pascal, Fortran, Cobol, assembly language, machine code, or the like. Functions, operations, components and/or features described herein with reference to one or more embodiments, is able to be combined with, or is able to be utilized in combination with, one or more other functions, operations, components and/or features described herein with reference to one or more other embodiments, or vice versa.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

I claim:

1. A computer-implemented method for initiating activities on a computing device on the basis of information related to electronic messages and/or gyroscope comprising:

a process of initiating an activity related to displaying a first message in a social network application wherein the invention measures the time for which a second message is viewed by the user of the computing device, and wherein the invention checks whether or not the first message viewed by the user of the computing device is highlighted, and wherein the invention uses a gyroscope to measure the position of the computing device in relation to a human face, and wherein the invention establishes when and how long the user of the computing device reads the second message in the feed of the social network application;

a process of initiating an activity related to displaying a third message in the social network application wherein the invention collects information about the current time, and wherein the invention collects information about the place of watching a fourth message, and wherein the user of the computing device enters a password in the social network application, and wherein the user of the computing device enters a barcode in the social network application, and wherein the invention displays the third message in the social network application;

a process of initiating an activity related to sending a set of messages to the user of the computing device wherein the invention collects information about the current time, and wherein the invention collect information about the time moment when the user of the computing device starts following a subscriber of the social network application, and wherein the invention sends the set of messages to the user of the computing device;

a process of initiating an activity related to sending a fifth message, which received the most views after being sent to a part of a list of subscribers of the social network, to an entire list of subscribers of the social network wherein the invention compares the popularity of two or more messages in the social network sent to the part of a list of subscribers of the social network, and wherein the message which received the most views will be sent to the entire list of subscribers of the social network;

a process of initiating an activity related to sending a sixth message to the subscriber of the social network application wherein the invention assesses if the input in a feed of the social network application contains a first parameter that is the same as a second parameter contained in a database, and wherein the invention sends the sixth message to the subscriber of the social network application, and wherein the sixth message is personalized;

a process of initiation of an activity related to providing a bonus to contacts who share a received message with other contacts wherein the user selectively or randomly selects a number of contacts in the online social network, and wherein the user of the computing device sends a seventh message to the selected contacts, and wherein the user of the computing device provides the bonus to the contacts who share the received message with the other contacts.

* * * * *